Patented Dec. 15, 1942

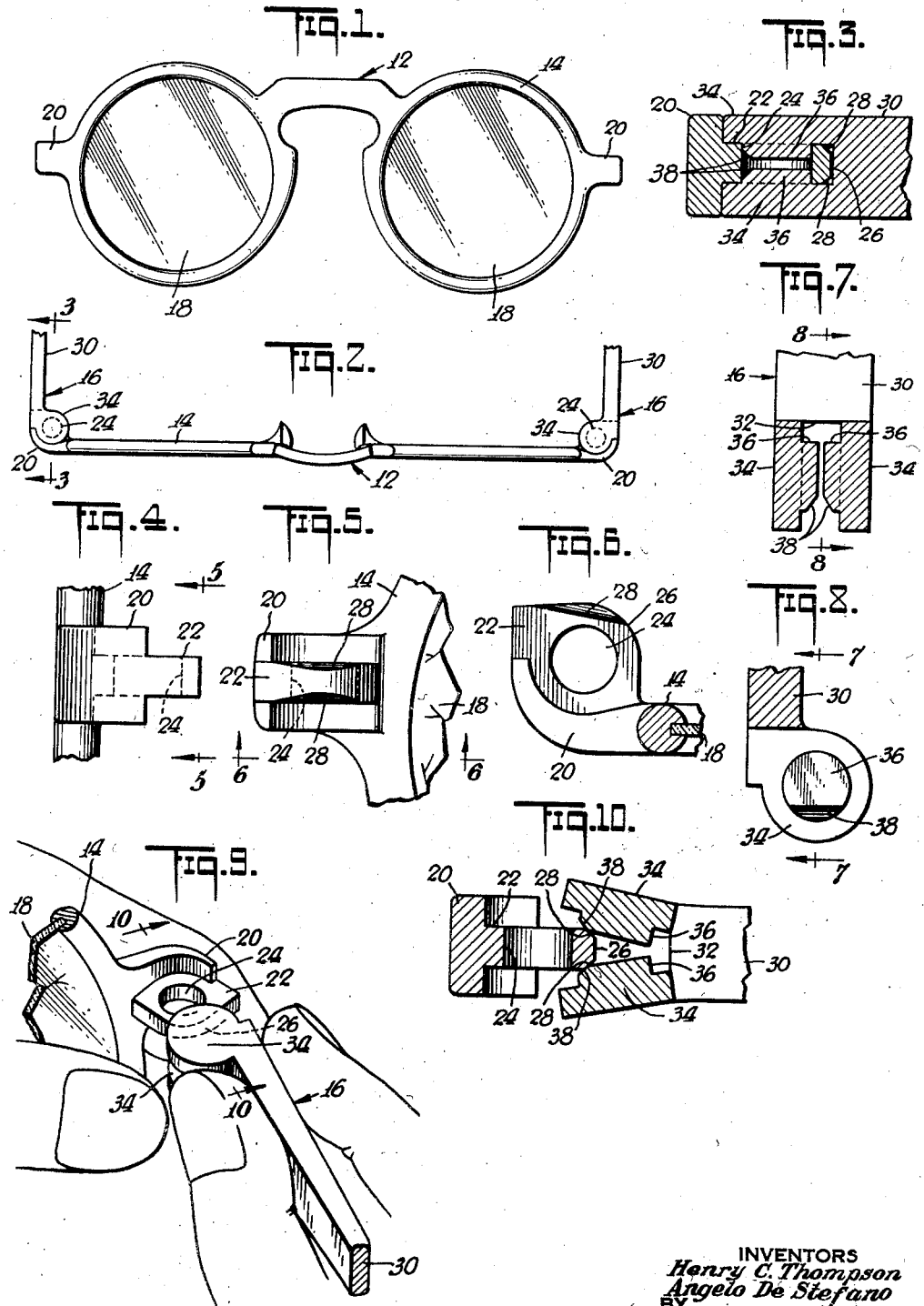

2,305,562

UNITED STATES PATENT OFFICE 2,305,562

SPECTACLE HINGE

Henry C. Thompson and Angelo De Stefano, Bogota, N. J., assignors to Columbia Protektosite Co., Incorporated, Carlstadt, N. J., a corporation of New Jersey Application April 30, 1940, Serial No. 332,440

3 Claims. (Cl. 88—53)

The present invention relates to the construction of a simplified spectacle temple connection and it has particular application to a pin-less hinge construction for connecting the temple members to the frame of a spectacle, sunglass, goggle, or the like, hereinafter referred to as a "spectacle."

It has been customary heretofore in pivotally connecting the temple members to the frame member of a spectacle, to use a hinge construction with a pintle in the form of a screw or rivet mounted in a preformed aperture of one of the joint pieces of the hinge. In this particular type of construction, it was generally necessary to make different temples for the right and left sides of the frame member, so that the number of parts and problems involved in assembly greatly increased the expense of the manufacture, which is important especially in the manufacture and sale of cheap glasses.

To permit interchangeable use of the temple members for the right and left sides of a pair of glasses, there was developed a longitudinally split temple member carrying rigidly and integrally preformed pintle projections adapted to fit into the bore of the frame member. In this construction, however, it was necessary to use a clamping screw or bolt to hold the split temple ends in contact with the pintle bearings, because the spreading of said split ends over the receiving member of the frame to insert the pintles in the bore thereof during assembly, caused a permanent "set" in the temple ends, which tended to cause them to remain separated.

The next development endeavored to eliminate entirely the use of a pin or screw in a pin-less hinge construction by forming the pintles on the temple members after the joint parts had been placed in their assembled position, and utilizing the bore of the frame member as a mold for said pintles. In this construction the joint parts of the hinge after assembly were retained together under continuous pressure resulting from the pintle molding operation. Due to the "cold flow" properties of the plastic spectacle material, this continuous pressure between the joint parts of the hinge caused them to become permanently strained or deformed after a period of time, so that the hinge joint became loose and wobbly. Then, too, in such a construction, each such hinge manufactured, was found to be different from every other such hinge, because no control could be effected over the internal pintle formations in the assembled hinge. Consequently, the hinges on the opposite temple arms were never alike, making an unsatisfactory product and one that would give considerable annoyance to the user.

With the present invention, however, we have been able to produce a pin-less hinge of durable construction, which obviates all of the aforementioned difficulties of the prior art spectacle hinges and provides an inexpensive, efficient and easily assembled hinge, requiring no pivotal pins or connecting clamping members such as a metal screw or rivet. The various parts of our pin-less hinge can be premolded separately with extreme accuracy, and can be expeditiously assembled, free from continuing stress or pressure so that it will not be subject to "cold flow" deformation after it is once assembled.

An object of the present invention is to provide a new and novel pin-less hinge construction for spectacles which is simple and inexpensive to make, and which permits accurate control over the formation of the various inter-connecting parts.

A further object of the invention is the provision of a pin-less hinge construction, which permits a very accurate and tight inter-connecting hinge arrangement without maintaining a constant pressure on the material, causing a "cold flow" deformation with a consequent eventual loosening of the hinge construction that would render the finished article unfit for sale commercially after a short period of time.

Another object of the invention is the provision of a pin-less hinge construction that facilitates easy assembly, but prevents ready separation after assembly and during movement of the respective parts in their various positions in normal use.

Another object of the invention is to provide a pin-less hinge construction that permits the use of an interchangeable temple member that can be premolded separately from the frame member, and which may thereafter be easily assembled, quickly and efficiently.

Other and further objects and advantages of the invention reside in the detailed construction shown, which result in simplicity, economy and efficiency, and which will be apparent from the following description, wherein several preferred forms of embodiment of the invention are shown, reference being had to the accompanying drawing, forming a part thereof, wherein like figures indicate like parts, in which:

Fig. 1 is a front elevational view of a pair of spectacles, sun-glasses, goggles or the like, embodying a pin-less hinge made in accordance with the invention;

Fig. 2 is a fragmentary top plan view of the pair of spectacles shown in Fig. 1;

Fig. 3 is a fragmentary cross-sectional view of the hinge shown in Fig. 2, the same being taken substantially along the line 3—3 thereof;

Fig. 4 is a fragmentary side elevational view of the frame member of the hinge shown in Fig. 2;

Fig. 5 is a fragmentary view of the hinge shown in Fig. 4, the same being taken substantially along the line 5—5 thereof;

Fig. 6 is a fragmentary plan view, partly in section, of the frame member of the hinge shown in Fig. 3, the same being taken substantially along the line 6—6 of Fig. 5;

Fig. 7 is a fragmentary cross-sectional view of the temple member of the hinge shown in Fig. 8, the same being taken substantially along the line 7—7 thereof;

Fig. 8 is a fragmentary sectional view of the temple member of the hinge shown in Fig. 7, the same being taken substantially along the line 8—8 thereof;

Fig. 9 is a fragmentary perspective view illustrating the first step of the method of assembling the temple member of the hinge on the frame member thereof;

Fig. 10 is a fragmentary cross-sectional view of the partly assembled parts shown in Fig. 9, the same being taken substantially along the line 10—10 thereof, looking in the direction of the arrows.

Referring now to the drawing, there is shown generally at 12 a pair of spectacles consisting of a frame member 14 and a pair of identical temple members 16. The frame member 14 and temple members 16 are desirably made entirely from any thermoplastic materials, such as cellulose acetate, nitro-cellulose, Lucite, etc.; or any thermo-setting materials, such as Bakelite, urea constituting a form of aldehyde, or any of the phenolic resins. As far as certain aspects of the invention are concerned, the frame member 14 and the temple members 16 may be made of metal, such as stainless steel, brass, nickel, silver, or any alloy of such metals.

The frame member 14, which includes the usual lenses 18, has a vertical arcuate extension member 20, desirably formed integrally with said frame member 14, and extending outwardly and rearwardly from each end thereof to form a hinge leaf. One of the joint pieces of the hinge comprises an eye member in the form of a horizontal flange plate member 22, extending rearwardly from the inner side of the arcuate extension member 20 intermediate the ends thereof, and desirably formed integrally therewith. A bearing aperture 24 extends axially through this flange plate member 22. The plate member 22 has its inner edge rounded, as indicated at 26, and extending concentrically to the adjacent side of the aperture 24. The upper and lower circumferential rear edges of the plate member 22 are chamfered or beveled, as indicated at 28, to facilitate assembling with the temple members 16, as will hereinafter be described.

The temple members 16 have their rearwardly extending arms 30 curved or bowed in any conventional manner (not shown in detail) to fit above or behind the ears of the wearer. The forward or opposite end of the temple member 16 carries the other joint piece of the hinge, and for that purpose is longitudinally and horizontally bifurcated as indicated at 32, to form a pair of opposed horizontally projecting jaws 34. Each jaw 34 has integrally formed on its inner surface an axial pivot stud or projection 36 chamfered or beveled on its forward edges as indicated at 38, and adapted to extend into the aperture 24 of the joint eye piece 22 to form a knuckle joint between the frame member 14 and its respective temple member 16.

In assembling the frame member 14 and the temple members 16, it will be noted that if the temple members are straight at their rear ends, they may be used interchangeably for either the right or left side of the spectacle frame 14. As shown in Fig. 9, the frame member 14 during assembly operation may be held in one hand and the temple member 16 in the other hand with their chamfered or beveled surfaces 28 and 38, respectively, opposing each other, and these members relatively forced towards each other. During this relative movement of the hinge parts, the surfaces 28 and 38, serving as cam conformations, will cause the easy entry of the hinge piece 22 between the two jaws 34.

We have found that if the studs 36 of a temple member 16 are snapped or forced instantaneously over the chamfered edge 28 of the extension or locking ring or eye piece member 22, during assembly, and by instantaneously we mean within the split fraction of a second, it is possible to assemble the two parts of the hinge with the studs 36 positioned within the lower and upper edges of the aperture 24 without in any way distorting, deforming or otherwise permanently enlarging the original molded spacing tolerance between the oppositely projecting pivot studs 36. Since the projecting studs 36 are molded separately from the aperture 24 of the frame member 14, they can be formed accurately to within substantially a few thousandths part of an inch, thereby maintaining an exact tolerance with respect to the receiving aperture 24. When the hinged parts are once assembled the bifurcated extensions 34 return to their normal molded position, and are not held under any continuing distortional stress or pressure. Therefore, the parts will remain in a perfect pivotal relation for the life of the glasses, and will not have a tendency to become loose and wobbly in use as in the case of assemblies that are molded or mechanically held under a constant pressure or stress when once assembled.

If, however, the assembly of the hinge is slowed up appreciably, we have found that the prolonged spreading stress induced in the bifurcations of the temple member 16 causes or permits a permanent "set" in the bifurcations of the temple member to take place, and thereafter such bifurcations never return to their original molded spacing arrangement. As a result, the assembled hinged joint is loose and wobbly, rendering the spectacles unfit for sale commercially. Even a period of spreading the bifurcations of the temple member 16 for a second or longer is sufficient with some materials to cause such a permanent "set" or distortion to take place in the projection 34 and make an unsatisfactory hinged joint. Because of the unlimited forms and combinations of plastics available, and the unlimited numbers of thicknesses of temple arms, etc., it is impractical to give accurate time periods for assembling without causing a permanent "set" or distortion in the material used, but we do know that the quicker the operation of assembling is conducted, the better is the hinge connection formed and the less tendency there is to effect any permanent distortion in the bifurcations of the temple arms.

Although we have only described in detail several modifications which the invention may assume, it will be readily apparent to those skilled in the art that the invention is not so limited, but that various other modifications may be made therein without departing from the spirit thereof or from the scope of the appended claims.

What we claim is:

1. In a spectacle hinge assembly, a frame and a temple member, one of said members having a pair of opposed jaws respectively provided with preformed pivot studs projecting inwardly thereof constituting one joint piece of the hinge, the other member provided with an extension constituting the other joint piece of the hinge having an aperture through which said studs are adapted to extend snugly and rotatably, one of said joint pieces having a chamfered section on one edge thereof adapted to be engaged by a portion of the other joint piece to spread said jaws to permit assembly.

2. In a spectacle hinge assembly, a frame member and a temple member, said temple member having a pair of opposed jaws respectively provided with preformed pivot studs projecting inwardly thereof constituting one joint piece of said hinge, said frame member having an extension constituting the other joint piece of said hinge provided with an aperture through which said studs project while the same is adapted to be snugly embraced between said jaws against axial play, said pivot studs having a chamfered section on opposing edges thereof adapted to permit insertion of said extension between said jaws during assembly operation to effect easy reception therebetween.

3. In a spectacle hinge assembly, a frame member and a temple member, said temple member having a pair of opposed jaws respectively provided with preformed pivot studs projecting inwardly thereof constituting one joint piece of said hinge, said frame member having an extension constituting the other joint piece of said hinge provided with an aperture through which said studs project while the same is embraced snugly between said jaws against axial play, said extension and said pivot studs having a beveled section on opposing edges thereof respectively adapted to permit easy insertion of said extension between said jaws to permit assembly.

HENRY C. THOMPSON.
ANGELO DE STEFANO.